(12) United States Patent
Gehring et al.

(10) Patent No.: US 7,564,923 B2
(45) Date of Patent: Jul. 21, 2009

(54) FREQUENCY OFFSET AND METHOD OF OFFSETTING

(75) Inventors: Mark R. Gehring, Portland, OR (US); Russell R. Moen, Tigard, OR (US); Brent R. Jensen, Hillsboro, OR (US)

(73) Assignee: Cypress Semiconductor Corporation, San Jose, CA (US)

(\*) Notice: Subject to any disclaimer, the term of this patent is extended or adjusted under 35 U.S.C. 154(b) by 566 days.

(21) Appl. No.: 11/261,166

(22) Filed: Oct. 27, 2005

(65) Prior Publication Data

US 2007/0098111 A1    May 3, 2007

(51) Int. Cl.
*H04L 27/12* (2006.01)
*H04L 27/20* (2006.01)

(52) U.S. Cl. .................. 375/303; 375/308; 332/100

(58) Field of Classification Search ................ 375/219, 375/221, 295, 296, 272, 279–281, 303, 308; 370/249; 455/69, 78; 332/100, 103, 117, 332/149

See application file for complete search history.

(56) References Cited

U.S. PATENT DOCUMENTS

| | | | |
|---|---|---|---|
| 4,349,887 A | 9/1982 | Crowley | |
| 4,481,642 A | 11/1984 | Hanson | |
| 5,084,669 A * | 1/1992 | Dent | 324/76.82 |
| 5,220,275 A * | 6/1993 | Holmqvist | 324/76.82 |
| 5,361,046 A * | 11/1994 | Kaewell et al. | 332/100 |
| 5,541,666 A * | 7/1996 | Zeidler et al. | 348/589 |
| 5,563,535 A * | 10/1996 | Corry et al. | 327/105 |
| 5,850,568 A | 12/1998 | Hawkins et al. | 395/877 |
| 6,052,362 A | 4/2000 | Somer | 370/246 |
| 6,172,571 B1 | 1/2001 | Moyal et al. | 331/11 |
| 6,434,187 B1 | 8/2002 | Beard et al. | 375/219 |
| 6,438,176 B1 | 8/2002 | Haran et al. | |
| 6,665,360 B1 | 12/2003 | Duffy | 375/354 |
| 6,850,116 B1 | 2/2005 | Early | 330/277 |
| 6,865,346 B1 | 3/2005 | Miller et al. | 398/135 |
| 6,985,705 B2 * | 1/2006 | Shohara | 455/164.1 |

OTHER PUBLICATIONS

International Preliminary Report for PCT Application No. PCT/US2006/060106, dated Apr. 29, 2008, 1 Page.
International Search Report for PCT Application No. PCT/US2006/060106, dated Oct. 11, 2007, 1 Page.
International Written Opinion for PCT Application No. PCT/US2006/060106, dated Oct. 11, 2007, 6 Pages.

\* cited by examiner

*Primary Examiner*—Young T. Tse

(57) ABSTRACT

A transmitter digital signal processor (DSP) circuit has a transmit frequency represented by n-bit data output from a look up table (LUT). The n-bit data is outputted to an n-bit accumulator structured to overflow at a rate based on the output n-bit data to output a phase. The circuit further has device structured to add an n-bit signed constant to the accumulator to offset the frequency represented by the n-bit data output from the LUT. A transceiver on a semiconductor chip may include as part of a transmitter circuit, a transmit DSP circuit that has the LUT, accumulator and device providing an n-bit signed constant to the accumulator to offset a transmit frequency in order to allow a receiver circuit on the transceiver to communicate directly with the transmitter circuit, and thus allowing testing of the transceiver.

18 Claims, 3 Drawing Sheets

US 7,564,923 B2

FREQUENCY OFFSET AND METHOD OF OFFSETTING

TECHNICAL FIELD

This disclosure relates to transmitter digital signal processor (DSP) circuits and more particularly to transmitter DSP circuits in low intermediate frequency (IF) transceivers.

BACKGROUND OF THE INVENTION

In a typical low IF transceiver, the transmitter portion is set at the same frequency as the local oscillator, which is used for both the receiver and transmitter. The receiver, however, needs to have its local oscillator offset from an incoming radio frequency (RF) signal by an amount equal to the IF frequency. This offset unfortunately prevents an RF loopback test because the transmitter is always at the same frequency as the oscillator and it is impractical to include another oscillator running at a frequency which is very close to that of the transmitter. Such an extra oscillator would require a separate phase-locked loop (PLL) and would consume a large area on a chip.

The testing of a typical low IF transceiver is currently performed using another chip to transmit to the device under test or use an expensive set of RF test equipment.

FIG. 1 is a block circuit diagram of a transmitter digital signal processor (DSP) 20 used in typical low IF transceivers. The DSP 20 includes look up table (LUT) based Gaussian-filtered Frequency Shift Keying (GFSK) modulator 22. The data 24 is input into the LUT modulator 22. The LUT 22 and a counter 26, that counts from zero up to N−1 where N is the number of samples per data bit, is used to look up the samples of the filtered data. The data 28 output from the LUT 22 represents an instantaneous frequency of a transmitted RF signal. The data 28 is fed to a latched phase accumulator 30. The output 32 from the accumulator 30 is the instantaneous phase of the RF transmit signal and is applied to a sine and cosine LUT 34, 36, which is a polar to rectangular conversion.

The outputs 38, 40 of the sine and cosine LUT 34, 36 are then converted by digital-to-analog converters (DACs) (not shown) to create In-phase and Quadrature (I and Q) signals of the transmitter, which are upconverted to the RF frequency.

SUMMARY OF THE INVENTION

A transmitter digital signal processor (DSP) circuit has a transmit frequency represented by n-bit data output from a look up table (LUT). The n-bit data is outputted to an n-bit accumulator structured to overflow at a rate based on the output n-bit data to output a phase. The circuit further has a device structured to add an n-bit signed constant to the accumulator to offset the frequency represented by the n-bit data output from the LUT. A transceiver on a semiconductor chip may include as part of a transmitter circuit, a transmit DSP circuit that has the LUT, accumulator and device providing an n-bit signed constant to the accumulator to offset a transmit frequency in order to allow a receiver circuit on the transceiver to communicate directly with the transmitter circuit, and thus allowing testing of the transceiver.

The foregoing and other features and advantages of the invention will become more readily apparent from the following detailed description of a preferred embodiment of the invention which proceeds with reference to the accompanying drawings.

DETAILED DESCRIPTION

Disclosed herein is a circuit that allows for the offsetting of the transmit frequency in a transmitter digital signal processor (DSP), a method of offsetting the transmit frequency in a transmitter DSP and a transceiver utilizing a transmitter DSP circuit that allows for offsetting the transmit frequency.

By offsetting the transmit frequency within the transmitter DSP, the transmit frequency can be set to be equal to the receiving frequency on a transceiver, therefore, allowing for loopback testing within the transceiver and thus eliminating the need for expensive RF testing equipment.

Figure 1:
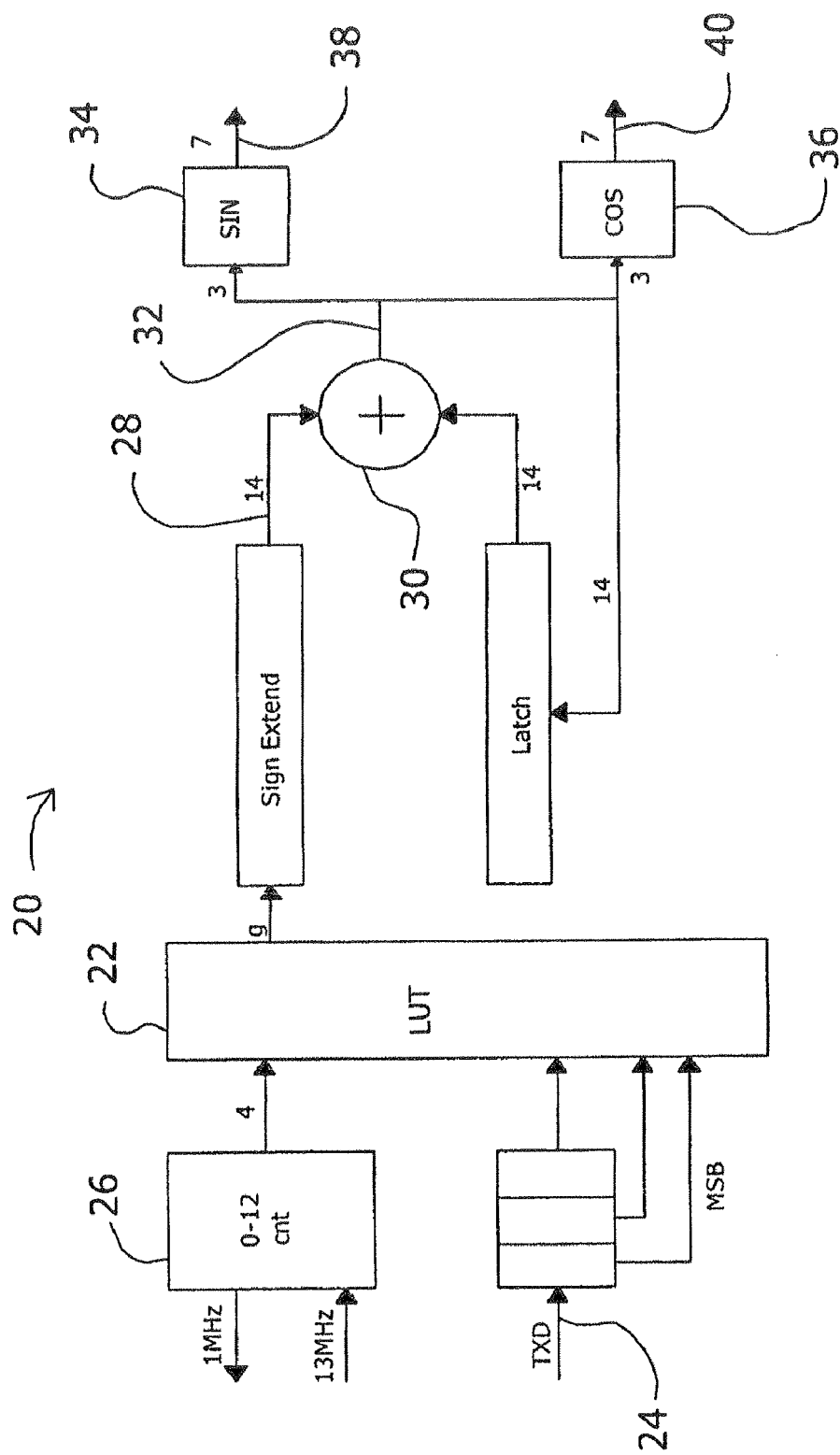
FIG. 1 is a block circuit diagram of a typical transmitter digital signal processor.
Figure 2:
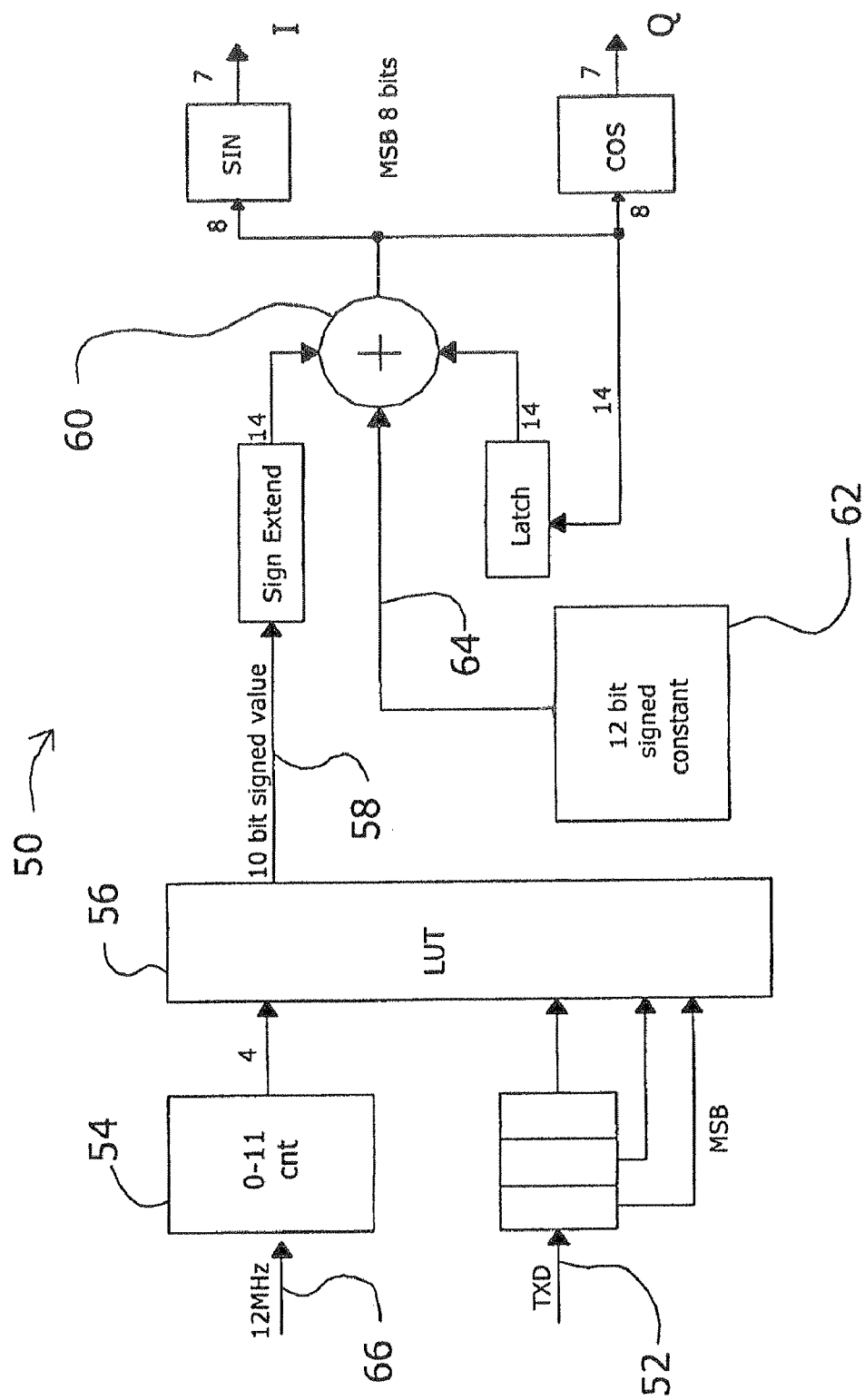
FIG. 2 is a block circuit diagram of a transmitter digital signal processor according to an embodiment of the invention.

FIG. 2 is a block circuit diagram of a transmitter DSP circuit 50 according to an embodiment of the invention. Transmit data 52 and counter 54 are connected to the look up table (LUT) 56. The LUT 56 may be a LUT-based Gaussian-filtered Frequency Shift Keying (GFSK) modulator. Data 58 output from the LUT 56 represents an instantaneous frequency of a transmit signal. The data 58 is fed into a latched accumulator 60. The accumulator 60 is structured to overflow at a rate based upon the data fed into it to output an instantaneous phase of a transmit signal.

A device 62 feeds a signed constant 64 into the latched accumulator 60. The signed constant 64 offsets the frequency represented by the data 58 output from the LUT 56.

The signed constant 64 is represented in FIG. 2 as being a 12-bit signed constant and the latched accumulator 60 is represented as being a 14-bit accumulator. These bit sizes are exemplary of an application that may be used within a low intermediate frequency (IF) transceiver. The circuit 50, however, is not limited to these bit sizes and other bit sizes are contemplated to be within the scope of the embodiments described herein.

The device 62 may be structured to be turned on and off. Here, the device 62 may have a single signed constant stored in it and when the device 62 is turned on, the frequency represented by the data 58 from the LUT 56 is offset at the accumulator 60 and testing or other diagnostic steps may be performed. When the device 62 is turned off, normal transmitting operation of the DSP circuit 50 occurs.

The device 62 may also be programmable such that a variety of signed n-bit constants may be fed to the latched accumulator 60. Different pre-selected signed n-bit constants 64 may be stored in the device 62 and may then be fed to the accumulator 60 for various tasks. The programmability of the device 62 may extend to programming the signed constant 64 during normal operation of the circuit 50.

Figure 3:
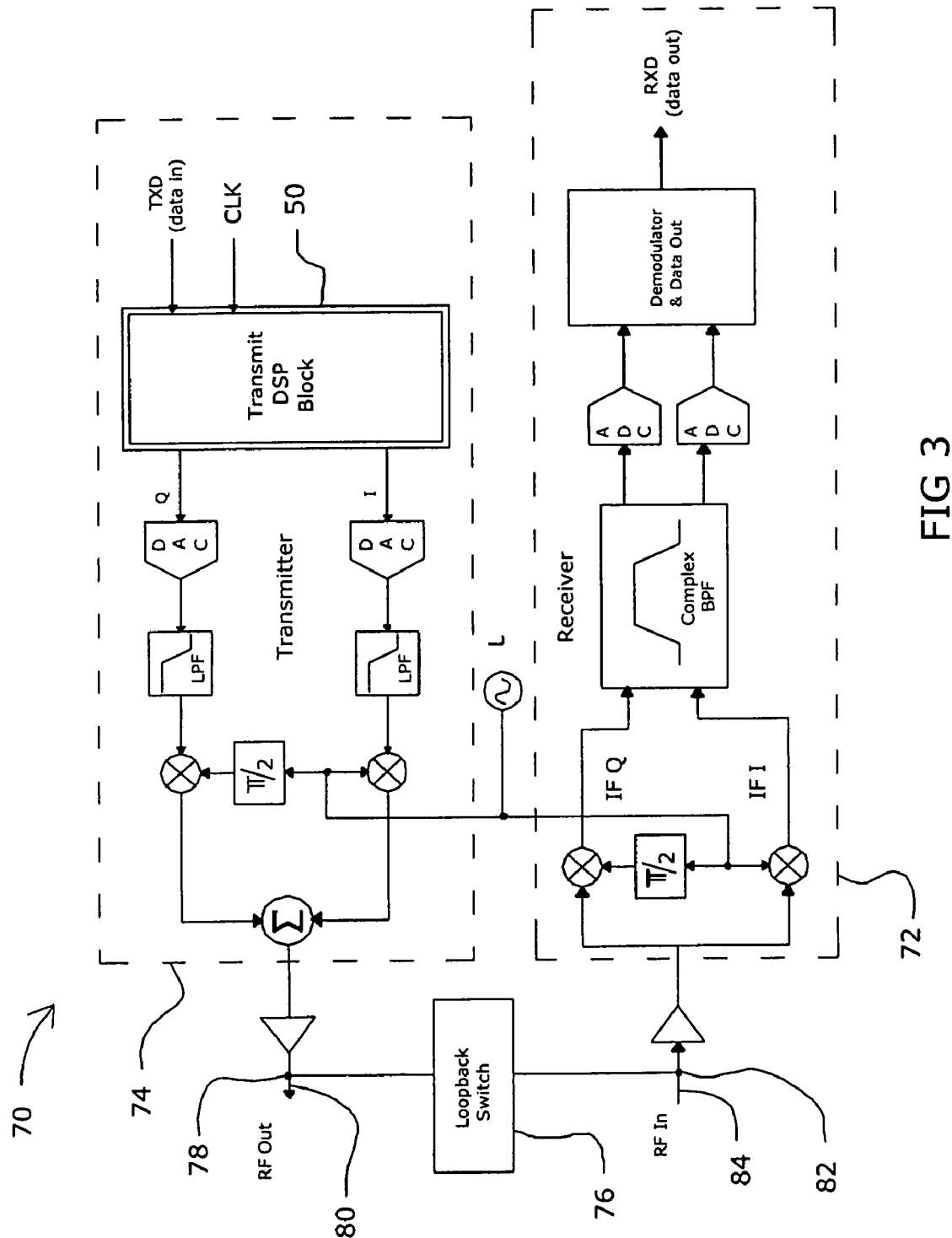
FIG. 3 is a block circuit diagram of a transceiver according to another embodiment of the invention.

One application of the circuit 50 may be with low IF transceivers, as shown in FIG. 3. When the DSP circuit 50 is used with a low IF transmitter, the data 58 output from the LUT 56 may be 10-bit data and the device 62 may be structured to output 12-bit constant 64. The data 58 and constant 64 may then be fed into a 14-bit accumulator 60. If a 12 Megahertz (MHz) clock signal 66 is used with the transmit DSP circuit 50, the accumulator 60 will overflow at a rate of:

$$F = 12\text{ MHz} * K / (2^{14})$$

where K is the value of the signed constant 64 added to the 14-bit accumulator 60 on each 12 MHz clock edge. For example, if K=1365, then the frequency will be 999755 Hz, or about 1 MHz.

Referring still to FIG. 2, a method of offsetting a frequency in a transmitter DSP circuit 50 will be described. N-bit data 58 representing a frequency of a transmit signal is output from the LUT 56 to the latched accumulator 60. The frequency represented by the data 58 is offset by adding signed constant 64 to the latched accumulator 60.

The signed constant 64 may be programmed to be a user-determined signed constant that is programmed before adding the constant 64 to the accumulator 60. To add the signed constant 64 to the accumulator 60, the device 62 may be preprogrammed with a single value. The device 62 is then turned on to add the constant 64 to the accumulator 60.

A clock signal 66 having a predetermined frequency, CLK (FIG. 3), may be inputted into the circuit 50. Offsetting the frequency represented by the data 58 may then include adding the signed constant 64 to the n-bit latched accumulator 60 to achieve a resulting rate of overflow, F, of the accumulator 60 that is determined by the equation:

$$F = CLK * K / (2^n)$$

Where F is the resulting rate of overflow, CLK is the frequency of the clock signal 66, K is the value of the signed constant 64 added to the accumulator 60 and n is the number of bits used by the n-bit accumulator 60.

FIG. 3 is a block circuit diagram of a radio transceiver 70 on a semiconductor chip. The transceiver 70 has a receiver circuit 72 and a transmitter circuit 74. The transmitter circuit 74 includes a transmitter DSP block 50. The details of the transmit DPS block 50 are shown as circuit 50 in FIG. 2. The block 50 includes a LUT 56 structured to output n-bit data 58 representing a transmit frequency and a latched n-bit accumulator 60 arranged to receive the n-bit data 58 from the LUT 56. The block 50 further includes device 62 structured to output a signed n-bit constant 64 to the latched n-bit accumulator 60. The signed n-bit constant offsets the frequency represented by the data 58.

The device 62, shown in FIG. 2, in DSP block 50 may be structured to be turned on and off such that when the device 62 is turned on, the device sends the signed n-bit constant 64 to the latched accumulator 60. The device 62 may also be structured to be programmable such that the device outputs a programmable signed n-bit constant 64.

The transceiver 70 may further include a loopback switch 76 that connects the receiver circuit 72 to the transmitter circuit 74. The loopback switch may be turned on and off to provide a direct connection between the two circuits 72, 74 when testing is performed on the transceiver 70. The loopback switch 76 may be replaced by a direct connection 76 between the circuits 72, 74.

A connection 78 may connect to the output 80 of the transmitter circuit 74, with the connection 78 connecting to an external lead (not shown) of the semiconductor chip. Connection 82 may connect to the input 84 of the receiver circuit 72, with the connection 82 connecting to an external lead (not shown) of the semiconductor chip. When the transceiver is arranged as described, the output 80 of the transmitter circuit 74 can be coupled with the input 84 of the receiver circuit 72 off of the semiconductor chip utilizing connectors 78, 82 to enable easy testing and monitoring of the chip.

The transceiver 70 may further be structured and configured to be a low IF transceiver such that the receiver circuit 72 is a low IF receiver circuit and the transmitter circuit 74 is a low IF transmitter circuit. Here, the transmitter circuit 74 may be structured to transmit a signal 80 at a first frequency. Then the receiver circuit 72 may be structured to receive a signal 84 at a second frequency. Referring to FIG. 2, the device 62 may be structured to output a signed n-bit constant 64, having a value that offsets the frequency represented by the data 58 output from the LUT 56 such that the transmitter circuit 74 transmits a signal 80 at the second frequency. By transmitting at the second frequency, the receiver circuit 72 can communicate directly with the transmitter circuit 74, thus enabling testing of the transceiver 70.

For some low IF transceivers 70, the value of the signed n-bit constant 64 may be one that offsets the frequency represented by the data 58 by 1 MHZ.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The invention claimed is:

1. A transmitter digital signal processor (DSP) circuit comprising:
   a look up table (LUT) structured to output multiple bits of data representing a frequency;
   a multiple-bit accumulator structured to overflow at a rate based upon the output data of the LUT to output a phase; and
   a device structured to add a multiple-bit signed constant to the accumulator to offset the frequency represented by the multiple bits of data output from the LUT, wherein the device structured to add the multiple-bit signed constant includes structure allowing the device to be turned on and off.

2. The circuit of claim 1 wherein the LUT is a LUT-based Gaussian-filtered Frequency Shift Keying modulator.

3. The circuit of claim 1 wherein the device structured to add the multiple-bit signed constant includes structure making the device programmable.

4. The circuit of claim 3 wherein the structure making the device programmable allows the device to provide a user-programmed constant during operation of the circuit.

5. The circuit of claim 1 wherein the LUT is structured to output 14-bit data representing the frequency, wherein the multiple-bit accumulator is a 14-bit accumulator, and wherein the device is structured to add a 12-bit signed constant.

6. The circuit of claim 1 wherein the circuit is a low intermediate frequency (IF) transmit DSP circuit.

7. A method of offsetting a frequency in a transmitter digital signal processing circuit, comprising:
identifying data representing the frequency from a look up table (LUT);
outputting the data to a latched accumulator; and
offsetting the frequency represented by the data output from the LUT by adding a signed constant to the latched accumulator, wherein a bit value associated with the signed constant is variable according to a mode of operation of the transmitter digital signal processing circuit.

8. The method of claim 7 further comprising programming a user-determined signed constant before adding the signed constant to the latched accumulator.

9. The method of claim 7 further comprising inputting a clock signal having a predetermined frequency to the LUT, wherein offsetting the frequency represented by the data output from the LUT includes adding the signed constant to the latched accumulator to get a resulting rate of accumulator overflow that is determined by the equation: $F=CLK*K/2$, where F is the rate of overflow, CLK is the frequency of the clock signal, K is the signed constant and n is the number of bits used by the latched accumulator.

10. The method of claim 7 further comprising turning on a device structured to output the signed constant.

11. A radio transceiver semiconductor chip, comprising:
a receiver circuit; and
a transmitter circuit including a transmitter digital signal process (DSP) block, wherein the transmitter DSP block includes a look-up table (LUT) structured to output multiple bits of data representing transmit frequency, a latched multiple-bit accumulator arranged to receive the multiple bits of data output from the LUT, and a device structured to output a multiple-bit signed constant to the latched multiple-bit accumulator thereby offsetting the frequency represented by the multiple bits of data output from the LUT, wherein the device structured to output the multiple-bit signed constant is structured to output a programmable multiple-bit signed constant.

12. The semiconductor chip of claim 11 further comprising a loopback switch connecting the receiver circuit to the transmitter circuit and arranged to provide testing of the receiver and transmitter circuits.

13. The semiconductor chip of claim 11 further comprising a connection coupling an output of the transmitter circuit to an input of the receiver circuit.

14. The semiconductor chip of claim 11 further comprising connections from the transmitter circuit and the receiver circuit arranged to allow an output of the transmitter circuit to be coupled to an input of the receiver circuit off of the semiconductor chip.

15. The semiconductor chip of claim 11 wherein the device structured to output the multiple-bit signed constant is structured to be turned on and off.

16. The semiconductor chip of claim 11 wherein the receiver circuit is a low intermediate frequency (IF) receiver circuit and the transmitter circuit is a low IF transmitter circuit.

17. The semiconductor chip of claim 11 wherein the transmitter circuit is structured to transmit a signal at first frequency, the receiver circuit is structured to receive a signal at a second frequency, and wherein the device is structured to output the multiple-bit signed constant having a value that offsets the frequency represented by the data output from the LUT such that the transmitter circuit transmits a signal at the second frequency.

18. The semiconductor chip of claim 11 wherein the device is structured to output the multiple-bit signed constant having a value that offsets the frequency represented by the data output from the LUT by 1 MHz

* * * * *

UNITED STATES PATENT AND TRADEMARK OFFICE
CERTIFICATE OF CORRECTION

PATENT NO. : 7,564,923 B2
APPLICATION NO. : 11/261166
DATED : July 21, 2009
INVENTOR(S) : Mark R. Gehring et al.

It is certified that error appears in the above-identified patent and that said Letters Patent is hereby corrected as shown below:

In the Claims:

Claim 9, column 5, line 29   Please replace the word "2" with -- $2^n$ --

Claim 18, column 6, line 39   Please add -- . -- at the end of the claim

Signed and Sealed this
Second Day of July, 2013

Teresa Stanek Rea
*Acting Director of the United States Patent and Trademark Office*